US008145891B2

(12) United States Patent
Edmiston et al.

(10) Patent No.: US 8,145,891 B2
(45) Date of Patent: Mar. 27, 2012

(54) BIOS-SELECTABLE DATA WIPING SYSTEM

(75) Inventors: Kurt Edmiston, Austin, TX (US); Donald Gage, Leander, TX (US); Ryan Holland, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 446 days.

(21) Appl. No.: 12/420,938

(22) Filed: Apr. 9, 2009

(65) Prior Publication Data

US 2010/0262817 A1 Oct. 14, 2010

(51) Int. Cl.
*G06F 15/177* (2006.01)
(52) U.S. Cl. ............................... 713/1; 711/164
(58) Field of Classification Search ....... 713/1; 711/164
See application file for complete search history.

(56) References Cited

U.S. PATENT DOCUMENTS

| 6,338,114 | B1 | 1/2002 | Paulsen et al. | |
|---|---|---|---|---|
| 6,564,307 | B1 | 5/2003 | Micka et al. | |
| 6,731,447 | B2 * | 5/2004 | Bunker et al. | 360/60 |
| 7,246,209 | B2 | 7/2007 | Tran et al. | |
| 7,349,118 | B2 | 3/2008 | Zipprich et al. | |
| 7,725,674 | B2 * | 5/2010 | Thorsen | 711/166 |
| 7,971,241 | B2 * | 6/2011 | Guyot et al. | 726/17 |
| 2004/0268073 | A1 * | 12/2004 | Morisawa | 711/164 |
| 2005/0091073 | A1 * | 4/2005 | Harris | 705/1 |
| 2005/0289289 | A1 * | 12/2005 | Chang | 711/103 |
| 2007/0192869 | A1 * | 8/2007 | Garfinkle | 726/26 |
| 2007/0208915 | A1 | 9/2007 | Tran et al. | |

OTHER PUBLICATIONS

Curtis E. Stevens, Working Draft Project American National Standard, Information Technology—AT Attachment 8—ATA/ATAPI Command Set (ATA8-ACS), Jul. 4, 2007, p. I-p. 432, T13/1699-D Revision 4b, National Standard of Accredited Standards Committee (INCITS), Western Digital Technologies, Inc., Lake Forest, CA.

* cited by examiner

*Primary Examiner* — Chun Cao
(74) *Attorney, Agent, or Firm* — Haynes and Boone, LLP

(57) ABSTRACT

A data storage device includes a computer-readable medium encoded with a computer program that, when executed communicates with a basic input/output system (BIOS), receives a user selection from the BIOS to wipe the data storage device and performs a wipe of the data storage device. In an embodiment, the wipe of the data storage device includes writing a series of 1s and/or 0s to substantially all data bits of the data storage device.

20 Claims, 4 Drawing Sheets

BIOS-SELECTABLE DATA WIPING SYSTEM

BACKGROUND

The present disclosure relates generally to information handling systems, and more particularly to a user selectable data wipe system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As is commonly known, information may be stored on a hard disk drive (HDD), solid state drive, compact disk, or other data storage device. From time to time, this information may need to be deleted or otherwise permanently removed from the data storage device for security reasons. For instance, eliminating personal data on HDDs that are returned to an IHS manufacturer has become a growing concern for many end users. As another example, confidential information may need to be removed from the data storage device before the IHS can be re-used or discarded. Additionally, government regulations may require that data be erased before the IHS is returned it to the vendor or reused.

Data storage device manufacturers generally allow programs to remove all information stored on the HDD by performing what is known as a data wipe. In a data wipe, an application may write all memory bits as 1's, 0's or a combination of these using one or more passes. Presently, data wipes are performed by using a third party software application (e.g., a computer program supplied by a third party to perform a data wipe of the data storage device). Traditionally, the third party applications may be executed using a floppy drive, a CD drive or a USB device.

In order for this type of application to be accepted by the U.S. Government, it has to conform to a third level data wipe process (e.g., what is known as a DOD 3 wipe). In this type of wipe process the data bits are over written three times to ensure all previous data is overwritten and cannot be recovered. Most third party data wipe software applications do support this standard. Unfortunately, using the third party applications, users need to boot the IHS to a disk operating system (DOS) in order to perform the wipe function. This becomes a problem because some IHS manufacturers are shipping IHSs without floppy disk drives (e.g., the DOS drive). Thus, there is no way to run a third party application that requires a floppy disk drive.

Accordingly, it would be desirable to provide an improved user selectable data wipe system absent the disadvantages discussed above.

SUMMARY

According to one embodiment, a data storage device includes a computer-readable medium encoded with a computer program that, when executed communicates with a basic input/output system (BIOS), receives a user selection from the BIOS to wipe the data storage device and performs a wipe of the data storage device. In an embodiment, the wipe of the data storage device includes writing a series of 1s and/or 0s to substantially all data bits of the data storage device.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
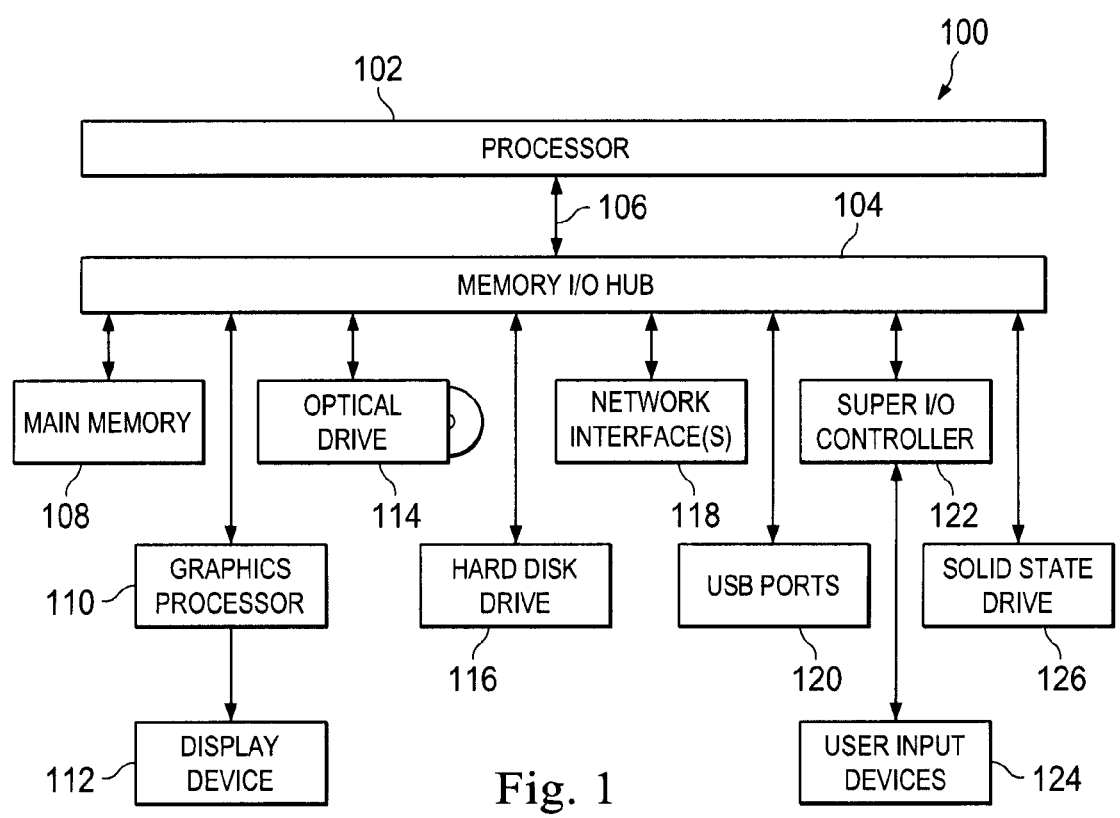
FIG. 1 illustrates a block diagram of an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present disclosure relates to data storage devices (e.g., HDD 116) and performing a data wipe of the data on the data storage device from the basic input/output system (BIOS). As such, this disclosure provides an alternate system to change the way data wipes are accomplished on data storage devices, which previously was by booting the IHS 100 from a floppy disk drive, a compact disk (CD) or a universal serial bus (USB) device and running a separate, third party, data wipe application program. In an embodiment, the present disclosure automates the data wipe process by having a user of the IHS 100 select an option for a data storage device data wipe from a BIOS boot menu, from a non-intuitive key stroke combination, or from some other system without the need for a third party application. The keystroke combination would be one that most users would not knowingly choose (e.g., Right Shift+Left Control+Left Alt+D). Other combinations of key strokes or commands may be used to initiate a wipe of the data storage device 116 according to the present disclosure. The data wipe system of the present disclosure may be included on-board the IHS 100, meaning that it is supported by the IHS 100, and the data storage device (e.g., HDD 116), without the need to use a third party application via a floppy disk drive, a compact disk (CD) or a universal serial bus (USB) device. It is to be understood that the HDD 116 and the solid state drive (SSD) 126 of the present disclosure may be used interchangeably. Additionally, it is contemplated that other types of data storage devices may be used with the present disclosure.

In embodiments of the present disclosure, a data wipe of a data storage device 116 may be accomplished in different ways. One embodiment includes an IHS BIOS that is capable of writing a set data pattern to the data storage device 116. That set pattern may be predefined in terms of writing all 0s, all 1s or a combination of 0s and 1s to a portion of all data bits, substantially all data bits or all data bits in the data storage device 116. In addition, the data wipe may be broken down into different levels of data wipes. For example, a Level 1 data wipe may include writing a single alphanumeric character (e.g., 0) across the entire disk surface. In another example, a Level 2 data wipe may include writing the same as Level 1 data wipe and also include writing a compliment number (e.g., 1) to the Level 1 data wipe. In yet another example, a Level 3 data wipe may include writing the same as a Level 1 data wipe and a Level 2 data wipe plus writing a third level, which may include writing a random character across the entire disk surface. In other words all data bits, whether used or unused, will be written with 0 or 1 data bit values one or more times to clear all previous values stored in the data bits so the previous values cannot be recovered. As such, a secure data clearing of the data storage device 116 is completed.

If power is interrupted at any time during the data wipe process, a command complete flag in the command set may not be cleared so that on subsequent power on of the IHS 100, the BIOS may either restart the data wipe process or continue the data wipe process where it left off at the time of the power loss. It is contemplated that any of these write strategies and others may be executed within the BIOS.

Because the data cannot be recovered after a data wipe, users may be asked multiple times whether they are sure they want to wipe the data from data storage device 116. Thus, in an embodiment, the user is asked three times before the data wipe routine starts. Then, the user may be asked again when a data storage device password is set. As the password is set, the BIOS will issue a command to access the data storage device 116. In an embodiment, this command may be aborted and on a retry attempt, a Security Unlock command may be decremented. In an embodiment, this process will occur two more times to ensure that the user really wants to wipe the data storage device 116. Then, on the fourth time the data storage device 116 will be locked with the what is known as a Security Freeze Lock Command. The next command to be issued is a command known as the Security Erase Prepare Command. After this, the next step in the process will be a Security Erase unit. Performing this, the BIOS may overwrite the memory data bits of the drive (e.g., every addressable sector) with a data value of zero. This command may be followed by a data value of one (e.g., again across every addressable sector). This may then be followed by writing a random character data value (e.g., once more across every addressable sector). Using this system, the data storage device 116 may overwrite all sectors internally (e.g., by bypassing busses and processors external to the data storage device 116). Thus, the data storage device should support this system and should also be operable via the BIOS or any other system that is operable to issue applicable data wipe commands (e.g., advanced technology attachment (ATA) commands).

At this point the data storage device 116 will be unusable because it will not hold any of the previous data, as was held before the data wipe. As such, the operating system (OS) will no longer exist on the data storage device 116. When the IHS is re-started, an error on reboot should be displayed on the display device 112. One possible message read as, "Boot sector not found, please install an operating system".

It is contemplated that the systems of the present disclosure may be implemented on Dell® M09 series platforms including the Latitude E4300, the Latitude E4200. It should be understood that the systems of the present disclosure may also be implemented on other IHSs 100 as well as on a variety of data storage devices, such as the HDD 116, the solid state drive 126, and more.

Figure 2:
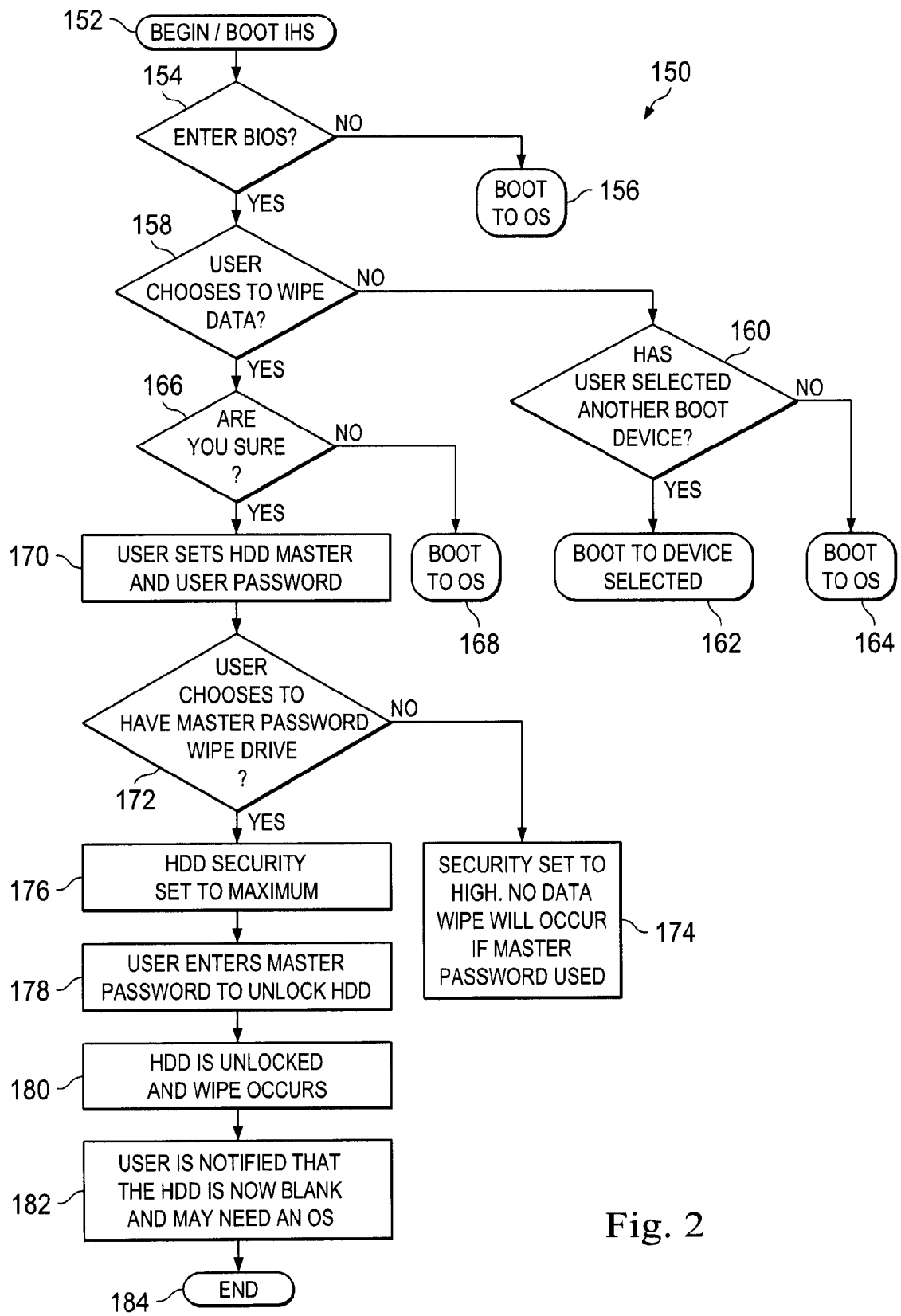
FIG. 2 illustrates a flowchart of an embodiment of user selectable data wipe method for use on an IHS, such as the IHS of FIG. 1.

FIG. 2 illustrates a flowchart of an embodiment of user selectable data wipe method 150 for use on an IHS, such as the IHS 100 of FIG. 1. The method 150 begins at 152 where the IHS 100 begins booting the IHS 100. Booting is well known to those skilled in the art. The method 150 then proceeds to decision block 154 where the method 150 determines whether a user has entered a command to enter the BIOS of the IHS 100. If no, the method 150 determines that the user has not entered a command to enter the BIOS of the IHS 100, the method 150 proceeds to block 156 where the method 150 boots the IHS 100 to the operating system. On the other hand, if yes, the method 150 determines that the user has entered a command to enter the BIOS of the IHS 100, the method 150 proceeds to decision block 158 where the method 150 determines whether the user has entered a command to wipe the data storage device (e.g., 116). If no, the method 150 determines that the user has not entered a command to wipe the data storage device, the method 150 proceeds to decision block 160 where the method 150 determines whether the user of the IHS 100 has selected another boot device. If yes at decision block 160 the user has selected another boot device, the method 150 proceeds to block 162 where the method 150 boots the IHS 100 to the device selected. On the other hand, if no at decision block 160, the method 150 determines that the user has not selected another boot device, the method 150 proceeds to block 164 where the method 150 boots the IHS 100 to the operating system.

Figure 3:
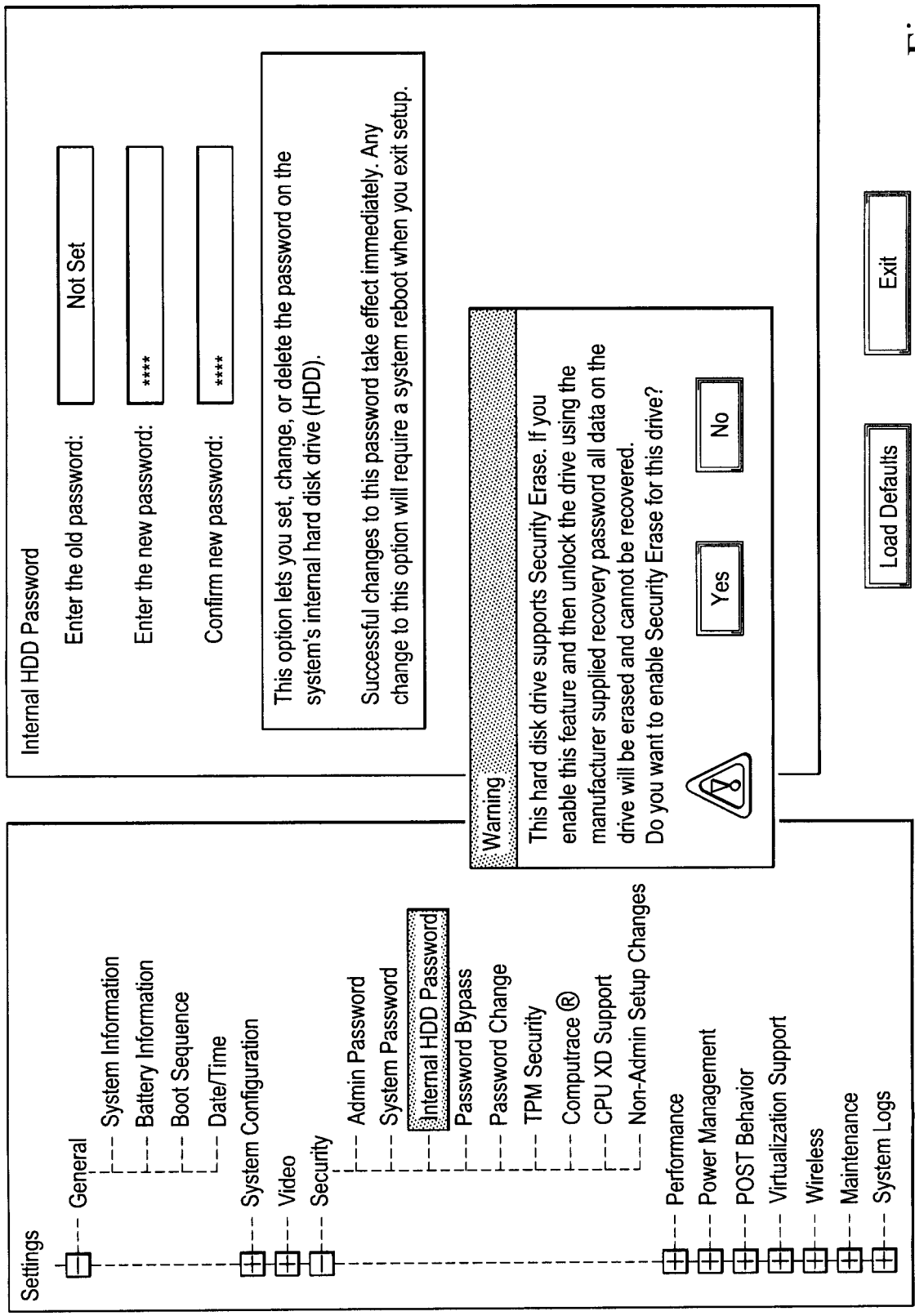
FIG. 3 illustrates an embodiment of a user interface page for use with the user selectable data wipe method of FIG. 2.
Figure 4:
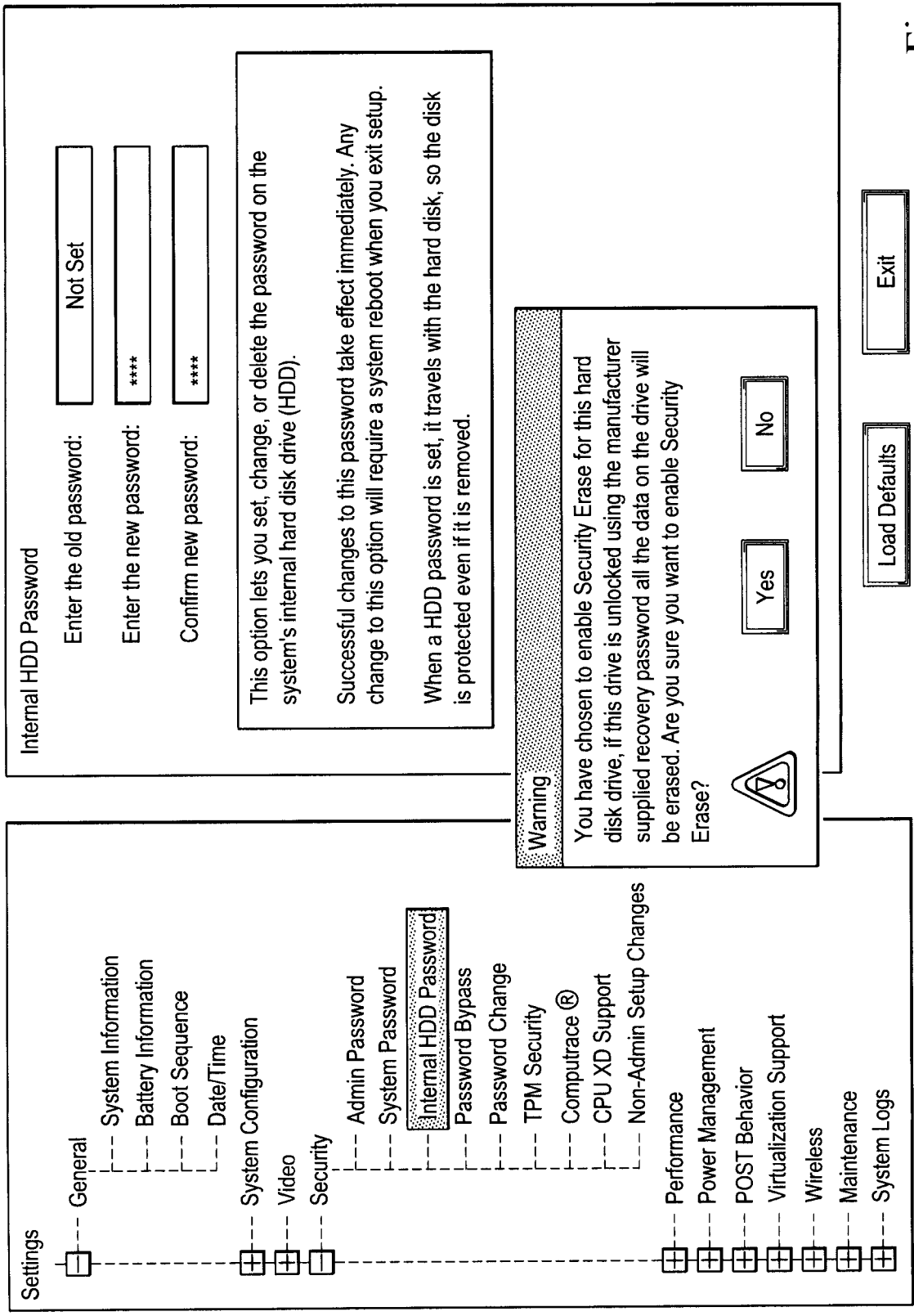
FIG. 4 illustrates an embodiment of a user interface page for use with the user selectable data wipe method of FIG. 2.

Returning now to decision block 158, if yes, the method 150 determines that the user has input a command indicating that the user has chosen to wipe the data storage device, the method 150 proceeds to decision block 166 where the method 150 asks the user if the user is sure that they want to wipe clean all of the information stored on the data storage device. If no, the method 150 determines that the user is not sure that they want to wipe the data storage device, the method 150 proceeds to block 168 where the method 150 boots the IHS 100 to the operating system. On the other hand, if yes, the method 150 determines that the user is not sure that they want to wipe the data storage device, the method 150 proceeds to block 170 where the method 150 allows the user to set the data storage device (e.g. HDD 116) master and user password. User interface pages as shown in FIGS. 3 and 4 may be used to interact with the user to allow the user to input information about wiping the data storage device. The method 150 then proceeds to decision block 172 where the method 150 determines whether the user chooses to use the master password to wipe the data storage device. If no, the method 150 determines that the user does not choose to use the master password to wipe the data storage device, the method 150 proceeds to block 174, where the security on the data storage device is set to high and no data wipe will occur if the master password is used. On the other hand, if yes, the method 150 determines that the user does choose to use the master password to wipe the data storage device, the method 150 proceeds to block 176, where the data storage device security is set to maximum security. The method 150 then proceeds to block 178 where the method 150 receives an entry from the user for the master password to unlock the data storage device. Next, the method 150 proceeds to block 180 where the data storage device is unlocked via the master password and the data wipe of the data storage device is performed.

As should be understood, the data wipe may be accomplished by instructing the data storage device to write a series of data 0s and/or a series of data 1s to all or substantially all data bits of the data storage device so that the data storage device is securely wiped clean so that data previously on the data storage device cannot be recovered. For example, the data wipe may conform to the DOD 3 wipe standard.

After the method 150 performs the data wipe of the data storage device at block 180, the method 150 proceeds to block 182 where the user is notified that the data storage device is not blank (wiped clean) and may need to have an operating system loaded onto it for the IHS to operate properly again. Then, the method 150 ends at block 184.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer-readable medium encoded with a computer program that, when executed:
   receives a user selection through a basic input/output system (BIOS) to wipe a data storage device having a plurality of existing data bits;
   performs a wipe of the data storage device, wherein the wipe of the data storage device includes overwriting an initial portion of the plurality of existing data bits of the data storage device until a power interrupt occurs; and
   upon a subsequent power up, determines that a flag has not been cleared and, in response, either restarts the wipe of the data storage device to overwrite the plurality of existing data bits of the data storage device or continues the wipe of the data storage device to overwrite a remaining portion of the plurality of data bits of the data storage device.

2. The computer-readable medium of claim 1, wherein the wipe of the data storage device includes writing a series of 1s over the plurality of existing data bits of the data storage device multiple times during the same wipe.

3. The computer-readable medium of claim 1, wherein the wipe of the data storage device includes writing a series of 0s over the plurality of existing data bits of the data storage device multiple times during the same wipe.

4. The computer-readable medium of claim 1, wherein the wipe of the data storage device bypasses data busses to the data storage device and internally overwrites all sectors of the data storage device.

5. The computer-readable medium of claim 1, wherein the wipe of the data storage device is performed using a master password for the data storage device.

6. The computer-readable medium of claim 1, wherein the wipe of the data storage device makes data stored on the data storage device unrecoverable.

7. The computer-readable medium of claim 1, wherein the wipe of the data storage device removes an operating system from the data storage device.

8. An information handling system (IHS) comprising:
   a processor;
   memory coupled with the processor; and
   a data storage device coupled with the processor and having a plurality of existing data bits; and
   a computer-readable medium encoded with a computer program that, when executed:
      receives a user selection through a basic input/output system (BIOS) to wipe the data storage device;
      performs a wipe of the data storage device, wherein the wipe of the data storage device includes overwriting an initial portion of the plurality of existing data bits of the data storage device until a power interrupt occurs; and
      upon a subsequent power up, determines that a flag has not been cleared and, in response, either restarts the wipe of the data storage device to overwrite the plurality of existing data bits of the data storage device or continues the wipe of the data storage device to overwrite a remaining portion of the plurality of data bits of the data storage device.

9. The IHS of claim 8, wherein the wipe of the data storage device includes writing a series of 1s over the plurality of existing data bits of the data storage device multiple times during the same wipe.

10. The IHS of claim 8, wherein the wipe of the data storage device includes writing a series of 0s over the plurality of existing data bits of the data storage device multiple times during the same wipe.

11. The IHS of claim 8, wherein the wipe of the data storage device bypasses data busses to the data storage device and internally overwrites all sectors of the data storage device.

12. The IHS of claim 8, wherein the wipe of the data storage device is performed using a master password for the data storage device.

13. The IHS of claim 8, wherein the wipe of the data storage device makes data stored on the data storage device unrecoverable.

14. The IHS of claim 8, wherein the wipe of the data storage device removes an operating system from the data storage device.

15. A method of wiping a data storage device, the method comprising:

providing an information handling system (IHS) including a data storage device having a plurality of existing data bits, and including a basic input/output system (BIOS) to control startup of the IHS;

receiving a user selection through the BIOS to wipe the data storage device;

performing a wipe of the data storage device, wherein the wipe of the data storage device includes overwriting an initial portion of the plurality of existing data bits of the data storage device until a power interrupt occurs; and upon a subsequent power up, determining that a flag has not been cleared and, in response, either restarting the wipe of the data storage device to overwrite the plurality of existing data bits of the data storage device or continuing the wipe of the data storage device to overwrite a remaining portion of the plurality of data bits of the data storage device.

16. The method of claim 15, wherein the wipe of the data storage device includes writing a series of 1s over the plurality of existing data bits of the data storage device multiple times during the same wipe.

17. The method of claim 15, wherein the wipe of the data storage device includes writing a series of 0s over the plurality of existing data bits of the data storage device multiple times during the same wipe.

18. The method of claim 15, wherein the wipe of the data storage device bypasses data busses to the data storage device and internally overwrites all sectors of the data storage device.

19. The method of claim 15, wherein the wipe of the data storage device is performed using a master password for the data storage device.

20. The method of claim 15, wherein the wipe of the data storage device makes data stored on the data storage device unrecoverable, and wherein the wipe of the data storage device removes an operating system from the data storage device.

\* \* \* \* \*